United States Patent
Matoba

[11] Patent Number: 5,918,069
[45] Date of Patent: Jun. 29, 1999

[54] SYSTEM FOR SIMULTANEOUSLY WRITING BACK CACHED DATA VIA FIRST BUS AND TRANSFERRING CACHED DATA TO SECOND BUS WHEN READ REQUEST IS CACHED AND DIRTY

[75] Inventor: Tsukasa Matoba, Kawasaki, Japan

[73] Assignee: Kabushiki Kaisha Toshiba, Kawasaki, Japan

[21] Appl. No.: 08/806,686

[22] Filed: Feb. 26, 1997

[30] Foreign Application Priority Data

Mar. 2, 1996 [JP] Japan .................................. 8-071393

[51] Int. Cl.$^6$ .................................................. G06F 13/16
[52] U.S. Cl. ........................ 395/841; 395/722; 395/861; 711/118; 711/138; 711/143; 711/146
[58] Field of Search ................................ 370/434; 400/22; 711/118, 154, 138, 143, 146; 395/729, 841, 801

[56] References Cited

U.S. PATENT DOCUMENTS

| | | | |
|---|---|---|---|
| 4,344,713 | 8/1982 | Cullen ......................................... | 400/22 |
| 5,111,386 | 5/1992 | Fujishima et al. ....................... | 711/118 |
| 5,634,112 | 5/1997 | Thome et al. ........................... | 711/154 |
| 5,729,546 | 3/1998 | Gupta et al. ............................ | 370/434 |

*Primary Examiner*—Thomas C. Lee
*Assistant Examiner*—Michael G. Smith
*Attorney, Agent, or Firm*—Finnegan, Henderson, Farabow, Garrett & Dunner, L.L.P.

[57] ABSTRACT

A bus bridge mutually connects a CPU bus to which a CPU and a corresponding cache memory having a write-back scheme are coupled, an I/O bus to which a bus master is coupled, and a main memory which is commonly accessed through the CPU bus or I/O bus. In response to an access request from the bus master to the main memory, a cache snooping section snoops a cache memory to see whether an address in the access request satisfies a cache hit or miss, and data corresponding to the address is dirty or clear. In response to a snooping result by the cache snooping section indicating that the cache hit has occurred and the data is dirty, a write-back control section writes back the data from the cache memory in the main memory. In the case where the access request indicates a read request, a data bypass section directly transfers the data from the cache memory onto the I/O bus while the write-back control section performs writing back. With this processing, data read processing from the main memory need not wait for completion of write-back processing with respect to the main memory. Therefore, even if a cache write-back operation is performed in response to a main memory access request from the bus master, the main memory access operation can be performed at a high speed.

16 Claims, 8 Drawing Sheets

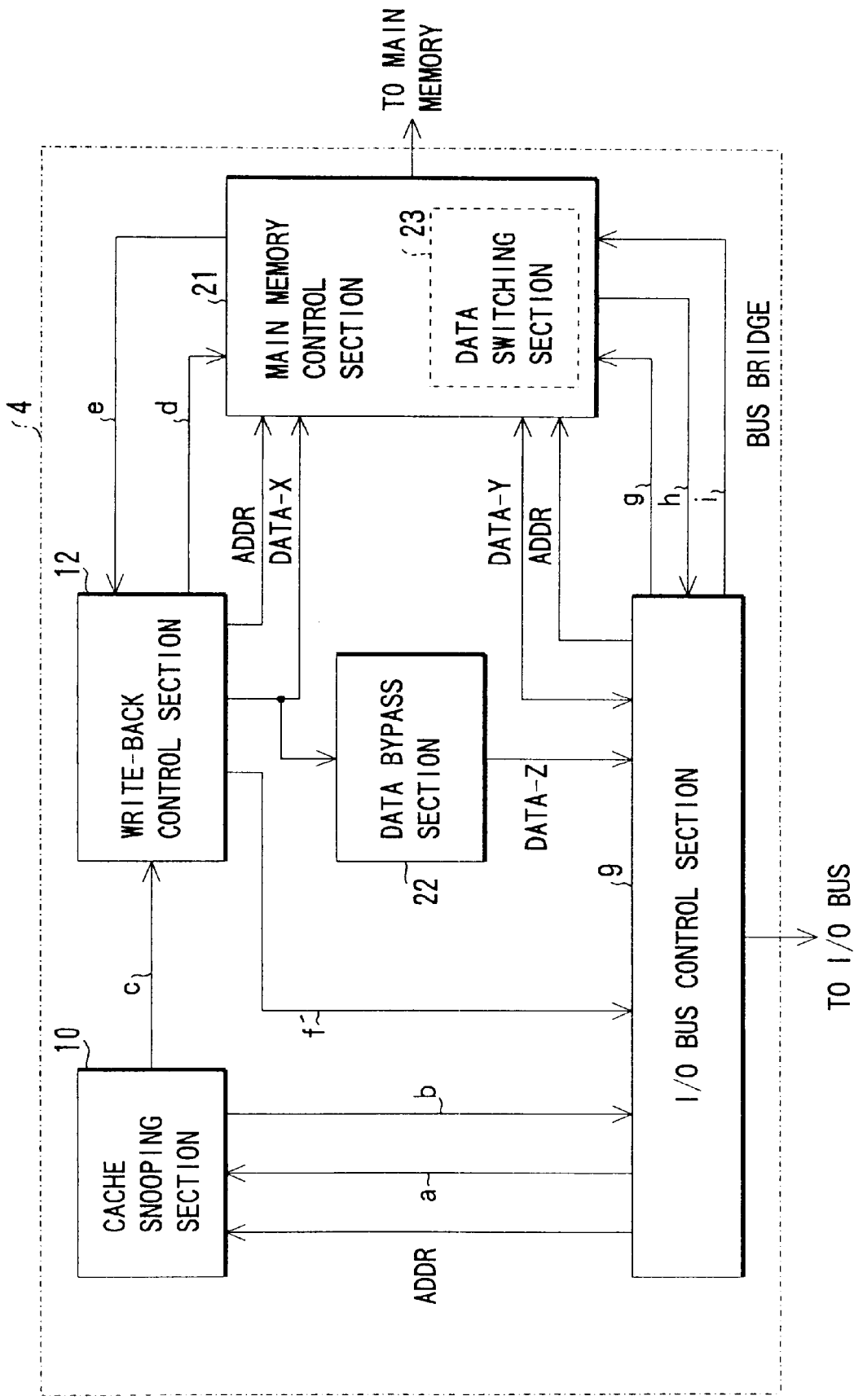
F I G. 5

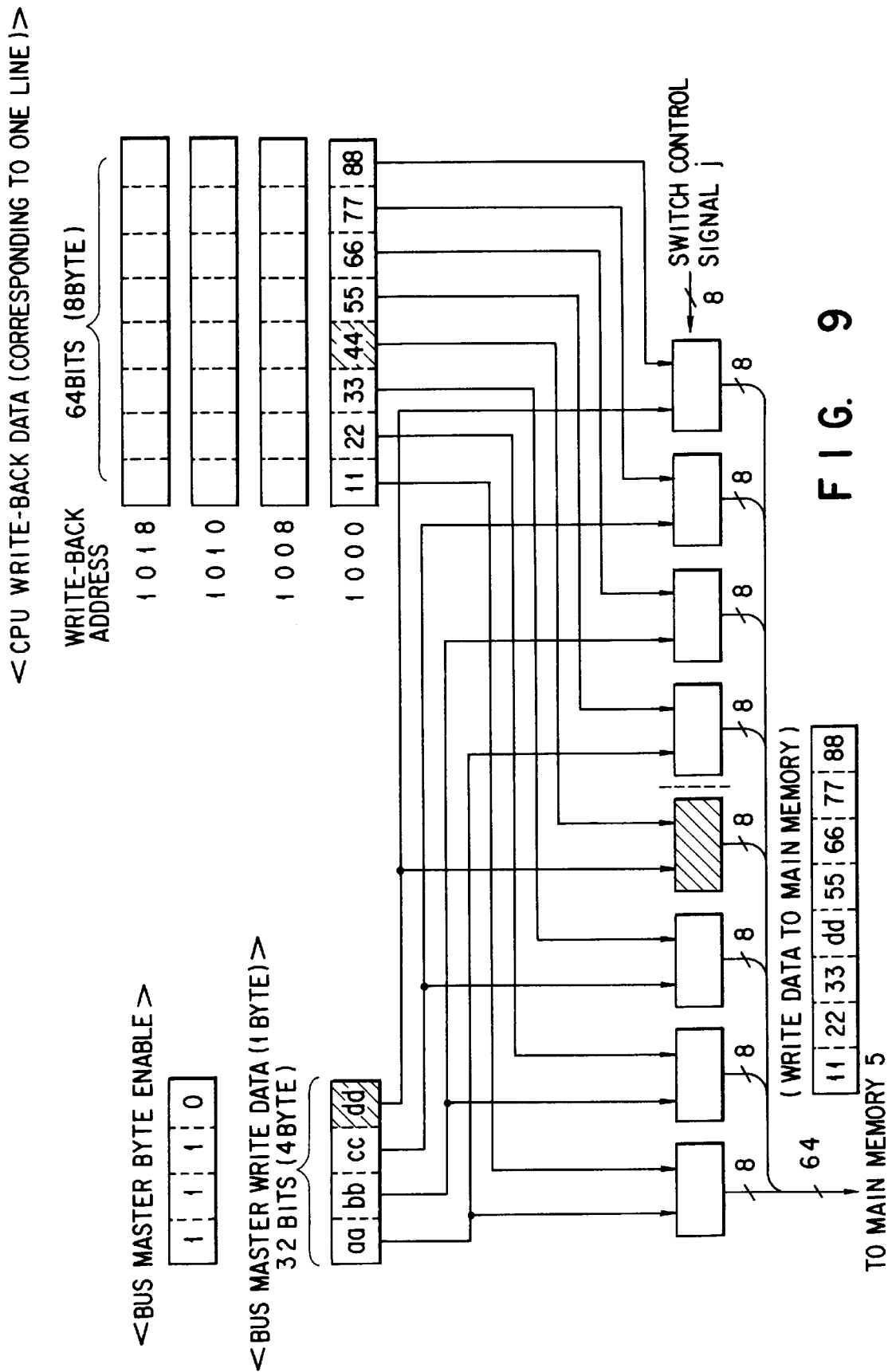
F I G. 9

SYSTEM FOR SIMULTANEOUSLY WRITING BACK CACHED DATA VIA FIRST BUS AND TRANSFERRING CACHED DATA TO SECOND BUS WHEN READ REQUEST IS CACHED AND DIRTY

BACKGROUND OF THE INVENTION

The present invention relates to a computer system having a bus bridge for coupling a processor bus and an I/O bus.

The processing speed of recent computers has remarkably increased, to which increases in processing speeds of CPUs, memories, and external/internal buses have contributed.

To reduce the b us traffic of the internal bus, a CPU bus to which the CPU is connected is separated from an I/O bus, e.g., a PCI (Peripheral Component Interconnect) bus, to which various I/O devices, a graphics controller, and the like are connected. In this case, the two buses are connected through a bus bridge.

The bus bridge has an interface with the main memory, in addition to the bus interfaces. The bus bridge is so constructed as to allow either the CPU bus or the I/O bus to access the ma in memory.

FIG. 1 is a block diagram showing the arrangement of a computer system having a bus bridge.

In FIG. 1, reference numeral 1 denotes a CPU; 2, a level 1 cache inside the CPU 1; 3, a level 2 cache; 4, a bus bridge; 5, a main memory; 6, a bus master; 7, a CPU bus (first bus); and 8, an I/O bus (second bus).

In the computer system having a bus bridge, software executed by the CPU 1, and the bus master 6, e.g., a SCSI (Small Computer System Interface) or a network device, which is connected to the I/O bus 8 share data in the main memory 5, and perform processing while exchanging information therebetween.

With this arrangement, the load of the CPU 1 can be reduced, resulting in an improvement in processing performance of the overall system.

The improvement in system performance is greatly influenced by the processing performance of the bus bridge 4.

Particularly, it is important to improve the respective data transfer abilities between the CPU 1 and the main memory 5 and between the bus master 6 and the main memory 5.

The operation of the CPU 1 in the computer system having a bus bridge will be described in brief.

The CPU 1 reads out an instruction and data (operand) required for an operation from the main memory 5, and writes an operation result and the like in the main memory 5.

In the example of FIG. 1, the CPU 1 incorporates the cache 2 therein, and both the caches 2 and 3 are of the write-back scheme.

Except for special cases, an operation of reading out data from the main memory 5 by the CPU 1 is a refill operation with respect to the cache 2 (cache refill operation). The data read operation of the CPU 1 from the main memory 5 is therefore performed by burst transfer in units of the cache line size (e.g., 32-byte data; 64-bit data×4 times).

A refill operation with respect to the cache 3 is also executed in parallel to the refill operation with respect to the cache 2.

When the read address from the CPU 1 satisfies a cache hit on the cache 3, data is read out not from the main memory 5 but from the cache 3, and transferred.

In the memory write operation by the CPU 1, when the write address satisfies a cache hit on the cache 3, data is written not in the main memory 5 but only in the cache 3. At this time, data at this address is in the dirty state. When the write address from the CPU 1 does not satisfy a cache hit on the cache 3, the data is written in only the main memory 5.

Next, an access operation of the bus master 6 with respect to the main memory 5 in the computer system having a bus bridge will be explained.

Normally, a plurality of bus masters 6 are connected to the I/O bus 8. Each bus master 6 starts the bus cycle after it gains control of the I/O bus 8 by some means.

For example, when the I/O bus 8 is a PCI bus, one bus arbiter (not shown) exists. This bus arbiter arbitrates request signals output from the respective bus masters 6, and asserts a grant signal to give one bus master 6 the right to use the I/O bus 8.

The bus master 6 which gained control of the bus by the grant signal from this bus arbiter starts the bus cycle on the I/O bus 8. This bus cycle is started by the address of a target to which the bus master 6 wants to access, and a command. The command represents, e.g., whether the bus cycle is a read or write cycle.

In this example, since the bus master 6 accesses the main memory 5, the target is the bus bridge 4, which accesses the main memory 5 instead.

This computer system having a bus bridge has one problem about the data transfer ability between the bus master 6 and the main memory 5.

That is, the data transfer ability is influenced by the cache 2 or 3 which exists in the CPU 1 or on the CPU bus 7.

Of data stored in the main memory 5, the cache 2 or 3 stores data which is frequently used by the CPU 1. When the CPU 1 updates data in the main memory 5, if a cache hit occurs on the cache 2 or 3, only data in the cache 2 or 3 is updated, and data in the main memory 5 is not immediately updated. The computer system employs this scheme called the write-back scheme.

This scheme is subject to a problem when, in accessing the main memory 5 by the bus master 6, the latest data corresponding to the address exists not in the main memory 5 but only in the cache 2 or 3.

In this case, the state of the cache 2 or 3 on the CPU 1 side must be snooped before the bus master 6 accesses the main memory 5.

More specifically, it is snooped to see whether data at an address A which the bus master 6 wants to access exists in the cache 2 or 3. If the data exists, it is snooped to see whether the data is in the updated (dirty) state. If the data is in the dirty state, data at the address A in the cache is invalidated, the data at the address A is written back in the main memory 5, and then the bus master 6 accesses the main memory 5.

The invalidation processing for a cache is an operation commonly required for systems carrying caches thereon, whereas the write-back processing is an operation unique to a cache of the write-back scheme.

The main memory rewrite scheme by a cache includes the write-through scheme and the write-back scheme. In general, the write-back scheme is valuated to have higher performance.

When the bus master 6 accesses the main memory 5, however, the cache of the write-back scheme requires write-back processing as described above. As the frequency of write-back operations increases, i.e., the data sharing rate between the CPU 1 and the bus master 6 increases, the data read/write operation speed of the bus master 6 cannot be increased.

Since the bus master (e.g., a SCSI or a network device) 6 is generally used to realize high-speed data transfer, a decrease in speed of data transfer with the main memory 5 is fatal to the bus master 6. In some cases, the bus master 6 does not correctly operate. To avoid the decrease in data transfer speed, for example, a data buffer having a large capacity must be arranged on the bus master 6 side.

This, however, results in an increase in cost, so this is not a wise practice.

FIG. 2 is a block diagram showing the arrangement of a conventional bus bridge used in the computer system shown in FIG. 1.

In FIG. 2, reference numeral 9 denotes an I/O bus control section; 10, a cache snooping section; 11, a main memory control section; and 12, a write-back control section.

Reference symbol "a" denotes a cache snooping request signal output from the I/O bus control section 9 to the cache snooping section 10; "b", a cache snooping result signal (representing the necessity/unnecessity of write-back processing) output from the cache snooping section 10 to the I/O bus control section 9; "c", a write-back processing request signal output from the cache snooping section 10 to the write-back control section 12; "d", a main memory write-back request signal output from the write-back control section 12 to the main memory control section 11; "e", a main memory write-back end signal output from the main memory control section 11 to the write-back control section 12; "f", a write-back processing end signal output from the write-back control section 12 to the I/O bus control section 9; "g", a main memory access request signal output from the I/O bus control section 9 to the main memory control section 11; and ="h", a main memory access end signal output from the main memory control section 11 to the I/O bus control section 9.

A case wherein processing in response to a read request from a given bus master 6 to the main memory 5 is performed through the conventional bus bridge will be described.

When the bus master 6 gains control of the I/O bus 8, and outputs an address and a read command onto the I/O bus 8, the I/O bus control section 9 of the bus bridge 4 receives the address and the read command to transfer the address to the cache snooping section 10 and outputs a cache snooping request signal "a" thereto.

The cache snooping section 10 outputs the address transferred from the I/O bus control section 9 onto the CPU bus 7, and outputs a cache snooping command. Then, the cache 2 inside the CPU 1, and the cache 3 detect the cache snooping command, and snoop to see whether data corresponding to the address output onto the CPU bus 7 is cached.

The states of the two caches 2 and 3 can be classified into the following five states (1) to (5).

(1) Neither of the caches 2 and 3 have cached the data corresponding to the supplied address (cache miss).

In this case, the states of the caches 2 and 3 do not change and do not influence (write back) the main memory 5. Therefore, a read access to the main memory 5 can be immediately started in response to a request from the bus master 6.

(2) Although one or both of the caches 2 and 3 have cached data corresponding to the supplied address (cache hit), the data has not been updated (not dirty) by the CPU 1.

In this case, since a write-back operation with respect to the main memory 5 is not performed, and the read access request is the one output from the bus master 6, the state (valid or invalid) of the cache does not change. Also in this case, a read access to the main memory 5 can be immediately started in response to a request from the bus master 6.

(3) One or both of the caches 2 and 3 have cached data corresponding to the supplied address, and only the data in the cache 2 has been updated (dirty).

In this case, the data from the cache 2 is first written back in the main memory 5. Then, the data in the cache 2 changes from the "dirty" state to the "clean" state. Upon completion of the write-back operation, a read access to the main memory 5 can be started in response to a request from the bus master 6.

(4) One or both of the caches 2 and 3 have cached data corresponding to the supplied address, and only the data in the cache 3 has been updated (dirty).

In this case, the data from the cache 3 is first written back in the main memory 5. Then, the data in the cache 3 changes from the "dirty" state to the "clean" state. Upon completion of the write-back operation, a read access to the main memory 5 can be started in response to a request from the bus master 6.

(5) One or both of the caches 2 and 3 have cached data at the supplied address, and both the data in the caches 2 and 3 have been updated (dirty).

In this case, the data from the cache 2 is written back in the main memory 5. The data in the cache 3 is replaced with the write-back data. Then, both the data in the caches 2 and 3 change to the "clean" state. Upon completion of the write-back operation, a read access to the main memory 5 can be started in response to a request from the bus master 6.

Of the five cache states in response to a read request from the bus master 6 to the main memory 5, in cases (1) and (2), no write-back operation is performed on the CPU bus 7.

FIG. 3 is a timing chart showing an operation in cases (1) and (2) wherein no cache write-back operation is performed after a read request is output from a certain bus master 6 in the computer system having the conventional bus bridge shown in FIG. 2.

More specifically, when the bus master 6 gains control of the I/O bus 8 by a grant signal from the bus arbiter in response to an access request from the bus master 6 to the I/O bus 8 (timings t1 to t3), the bus master 6 supplies an address and a read command to the I/O bus control section 9 of the bus bridge 4 through the I/O bus 8 (timing t4).

The I/O bus control section 9 then outputs a cache snooping request signal "a" to the cache snooping section 10 (timing at t5). The cache snooping section 10 snoops the hit/miss and the dirty/clean state in the caches 2 and 3 through the CPU bus 7 (timings t6 to t9).

In this case, since no cache hit occurs, or data is clean even if a cache hit occurs, the cache snooping section 10 informs the I/O bus control section 9 by a cache snooping result signal "b" of the unnecessity of a cache write-back operation, i.e., permission to start a main memory read. The I/O bus control section 9 outputs a main memory read request signal "g" to the main memory control section 11 (timings t9 and t10).

Then, target data is read out from the main memory 5 in accordance with an address supplied from the bus master 6 to the main memory control section 11 through the I/O bus control section 9 (timings t10 to t14). The data read by the main memory control section 11 is supplied to the I/O bus control section 9 together with a main memory read end signal "h", and transferred to the bus master 6 through the I/O bus 8 (timings t14 and t15).

If no cache write-back operation is performed in response to a read request from the bus master 6 to the main memory 5, immediately after the unnecessity of a write-back operation is ascertained by snooping the caches, target data is read out from the main memory 5 and transferred to the bus master 6.

As the main memory 5, a DRAM is generally used. In accessing data corresponding to a target address in this DRAM, a row address is first supplied, and then a column address is supplied.

On the other hand, of the five cache states in response to a read request from the bus master 6 to the main memory 5, in cases (3) to (5), a write-back operation is performed on the CPU bus 7.

FIG. 4 is a timing chart showing an operation in cases (3) to (5) wherein a cache write-back operation is performed after a read request is output from the bus master 6 in the computer system having the conventional bus bridge shown in FIG. 2.

More specifically, when the bus master 6 gains control of the I/O bus 8 by a grant signal from the bus arbiter in response to an access request from the bus master 6 to the I/O bus 8 (timings t1 to t3), the bus master 6 supplies an address and a read command to the I/O bus control section 9 of the bus bridge 4 through the I/O bus 8 (timing t4).

A cache snooping request signal "a" is output from the I/O bus control section 9 to the cache snooping section 10 (timing at t5). The cache snooping section 10 snoops the hit/miss and the dirty/clean state in the caches 2 and 3 through the CPU bus 7 (timings t6 to t9).

In this case, since a cache hit occurs in the cache, and data is in the dirty state, the cache snooping section 10 informs the I/O bus control section 9 by a cache snooping result signal "b" of the necessity of a cache write-back operation. The I/O bus control section 9 is controlled to wait until write-back processing of write-back data in the main memory 5 is completed. At the same time, the cache snooping section 10 outputs a write-back processing request signal "c" to the write-back control section 12 (timing t9).

Then, the write-back control section 12 performs write-back processing for data corresponding to one cache line (e.g., 32-byte data; 64-bit data×4 times) with respect to the CPU bus 7 (timings t9 to t13). Subsequently, write-back processing for write-back data "DATA-X" with respect to the main memory 5 is performed in response to a main memory write-back request signal "d" from the write-back control section 12 to the main memory control section 11 (timings t13 to t19).

Upon completion of the write-back processing for the write-back data, the main memory control section 11 outputs a main memory write-back end signal "e" to the write-back control section 12. The write-back control section 12 outputs a write-back processing end signal "f" to the I/O bus control section 9 to inform it of permission to start a main memory read operation. The I/O bus control section 9 outputs a main memory read request signal "g" to the main memory control section 11 (timings t19 and t20).

Target data is read out from the main memory 5 in accordance with an address supplied from the bus master 6 to the main memory control section 11 through the I/O bus control section 9 (timings t20 to t24). The data read by the main memory control section 11 is supplied to the I/O bus control section 9 together with a main memory read end signal "h", and transferred to the bus master 6 through the I/O bus 8 (timings t24 and t25).

If a cache write-back operation is performed in response to a read request from the bus master 6 to the main memory 5, after the necessity of a write-back operation is determined by snooping the caches, write-back data is temporarily written back in the main memory 5, and then target data is read out from the main memory 5 and transferred to the bus master 6.

On the other hand, an operation performed when no cache write-back operation is performed in response to a write request from the bus master 6 is almost the same as the above-described operation (FIG. 3) performed when no cache write-back operation is performed in response to a read request, except that the command from the bus master 6 at timing t4 is a write command, the main memory access request signal "g" to the main memory control section 11 at timing t10 is replaced with a main memory write request signal, and data is written in accordance with the address supplied from the bus master 6 to the main memory control section 11 through the I/O bus control section 9.

If, therefore, no cache write-back operation is performed in response to a write request from the bus master 6 to the main memory 5, immediately after the unnecessity of a write-back operation is ascertained by snooping the caches, data from the bus master 6 is written in the main memory 5.

An operation performed when a cache write-back operation is performed in response to a write request from the bus master 6 is also almost the same as the above-described operation (FIG. 4) performed when a cache-write back operation is performed in response to a read request, except that the command from the bus master 6 at timing t4 is a write command, the main memory access request signal "g" to the main memory control section 11 at timing t20 is replaced with a main memory write request signal, and data is written in accordance with the address supplied from the bus master 6 to the main memory control section 11 through the I/O bus control section 9.

If a cache write-back operation is performed in response to a write request from the bus master 6 to the main memory 5, after the necessity of a write-back operation is established by snooping the caches, write-back data is temporarily written back in the main memory 5, and then data from the bus master 6 is written in the main memory 5.

In this manner, in the computer system using the conventional bus bridge (see FIG. 2), if no cache write-back operation is performed in response to an access request from the bus master 6 to the main memory 5, data can be immediately read out from or written in the main memory 5 in accordance with the address from the bus master 6. However, if a cache write-back operation is performed, data cannot be read out from or written in the main memory 5 until cache write-back data from the CPU bus 7 side is temporarily written back in the main memory 5. For this reason, to respond to a read/write request from the bus master 6, two stages of data processing must be performed for the main memory 5. Accordingly, as described above, as the frequency of write-back operations increases, i.e., the data sharing rate between the CPU 1 and the bus master 6 increases, the data read/write speed of the bus master 6 cannot be increased.

BRIEF SUMMARY OF THE INVENTION

Accordingly, it is an object of the present invention to provide a computer system having a bus bridge which can access a main memory at a high speed even if a cache write-back operation must be performed after an access request is output from a bus master to the main memory.

According to the first aspect of the present invention, there is provided a computer system comprising: a first bus;

a processor coupled to the first bus; a cache memory having a write-back scheme, coupled to the first bus and accessed by the processor; a second bus; a bus master coupled to the second bus; a main memory which is commonly accessed through the first bus or second bus; and a bus bridge for connecting the first and second buses, the bus bridge comprising: cache snooping means, responsive to an access request from the bus master to the main memory, for snooping the cache memory to see whether an address in the access request satisfies a cache hit or miss, and data corresponding to the address is dirty or clear, write-back means, responsive to a snooping result by the cache snooping means indicating that the cache hit has occurred and the data is dirty, for writing back the data from the cache memory in the main memory, and data bypass means for, in the case where the access request indicates a read request, directly transferring the data from the cache memory onto the second bus while the write-back means performs writing back.

According to the second aspect of the present invention, there is provided a bus bridge for mutually connecting a first bus to which a processor and a corresponding cache memory having a write-back scheme are coupled, a second bus to which a bus master is coupled, and a main memory which is commonly accessed through the first bus or second bus, comprising: cache snooping means, responsive to an access request from the bus master to the main memory, for snooping the cache memory to see whether an address in the access request satisfies a cache hit or miss, and data corresponding to the address is dirty or clear; write-back means, responsive to a snooping result by the cache snooping means indicating that the cache hit has occurred and the data is dirty, for writing back data from the cache memory in the main memory; and data bypass means for, in the case where the access request indicates a read request, directly transferring the data from the cache memory onto the second bus while the write-back means performs writing back.

In the bus bridge, the data bypass means may comprise an FIFO (First-In First-Out) memory.

The bus bridge may further comprise main memory access means, responsive to the snooping result by the cache snooping means indicating the cache miss, for directly accessing the main memory from the second bus in accordance with the address in the access request.

The bus bridge may further comprise main memory write means for, in the case where the access request indicates a write request, reflecting the data from the cache memory on the data from the bus master and writing the resultant data in the main memory while the write-back means performs writing back.

In this case, the main memory write means preferably comprise means for merging the data from the cache memory and the data from the bus master.

The main memory may be a DRAM (Dynamic Random Access Memory).

The bus bridge may further comprise preparatory row activation means for activating a row address of the main memory in accordance with the address in the access request, in advance while the cache snooping means performs snooping. In this case, the bus bridge preferably further comprise means for designating a column address of the main memory in accordance with the address in the access request, thereby accessing the main memory.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 5 is a block diagram showing the arrangement of a bus bridge used in the computer system shown in FIG. 1 according to an embodiment of the present invention;

FIG. 9 is a view for explaining an operation of switching and selecting write-back data (64-bit data×4) corresponding to one cache line, and bus master write data (32-bit data) including 1-byte write data in the data switching section arranged in the main memory control section in the bus bridge shown in FIG. 5.

DETAILED DESCRIPTION OF THE INVENTION

An embodiment of the present invention will be described below with reference to the accompanying drawings.

FIG. 5 is a block diagram showing the arrangement of a bus bridge used in a computer system according to an embodiment of the present invention. The arrangement of the present invention is characterized by this bus bridge.

Figure 1:
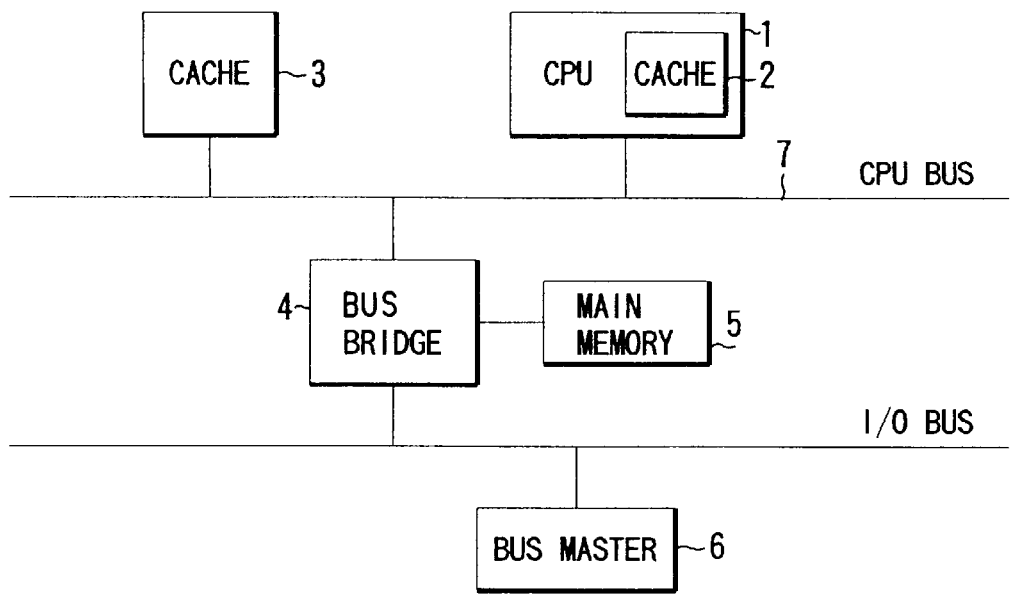
FIG. 1 is a block diagram showing the arrangement of a computer system having a bus bridge, which is used in the description of the prior art and the present invention.
Figure 2:
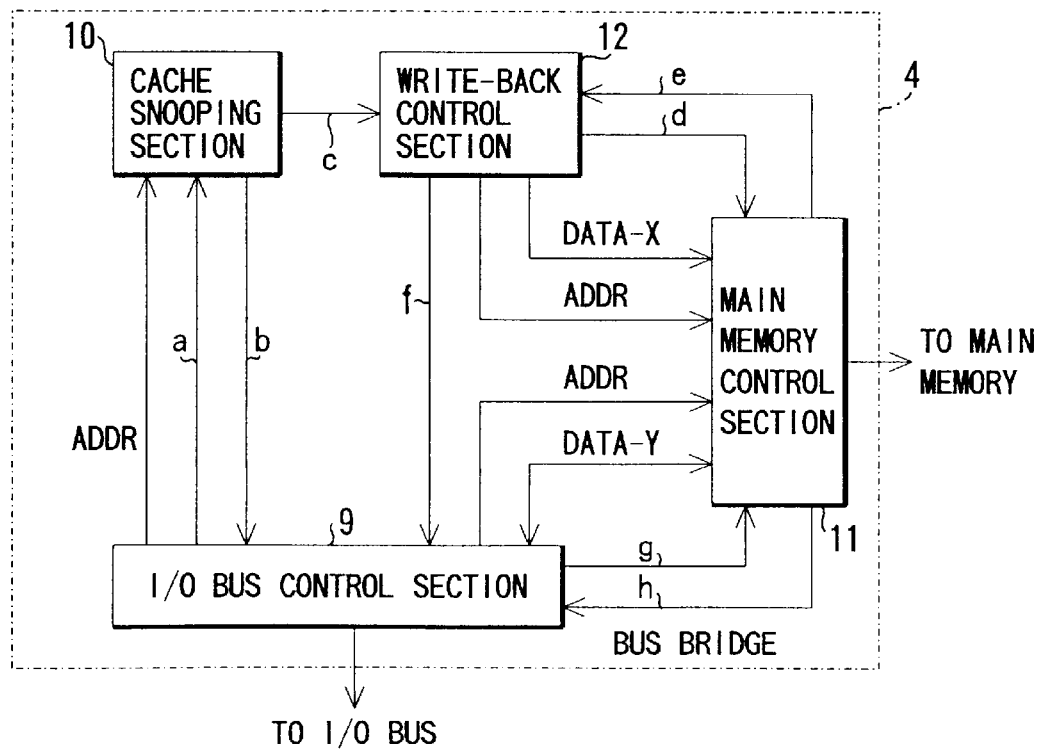
FIG. 2 is a block diagram showing the arrangement of the conventional bus bridge used in the computer system shown in FIG. 1.

Note that the overall arrangement of the computer system including this bus bridge is the same as the above system arrangement in FIG. 1, and a description thereof will be omitted.

In the bus bridge shown in FIG. 5, reference numeral 9 denotes an I/O bus control section; 10, a cache snooping section; 12, a write-back control section; 21, a main memory control section; and 22, a data bypass section.

The data bypass section 22 is connected between a data transfer line (DATA-X) extending from the write-back control section 12 to the main memory control section 21, and the I/O bus control section 9. The data bypass section 22 incorporates, e.g., a FIFO (First-In First-Out) memory therein.

The main memory control section 21 comprises a data switching section 23 for switching data "DATA-X" from the CPU 1 side and data "DATA-Y" from the bus master 6 side in units of bytes when data is written in a main memory 5.

The contents of signals to be input/output between respective blocks which constitute the bus bridge are as follows.

More specifically, reference symbol "a" denotes a cache snooping request signal output from the I/O bus control section 9 to the cache snooping section 10; "b", a cache snooping result signal (representing necessity/unnecessity of write-back processing) output from the cache snooping section 10 to the I/O bus control section 9; "c", a write-back processing request signal output from the cache snooping section 10 to the write-back control section 12; "d", a main memory write-back request signal output from the write-back control section 12 to the main memory control section 21; "e", a main memory write-back end signal output from the main memory control section 21 to the write-back control section 12; "f", a write-back data ready signal output from the write-back control section 12 to the I/O bus control section 9; "g", a main memory access request signal output from the I/O bus control section 9 to the main memory control section 21; "h", a main memory access end signal output from the main memory control section 21 to the I/O bus control section 9; and "i", a main memory (DRAM) activation request signal output from the I/O bus control section 9 to the main memory control section 21.

When the main memory activation request signal "i" is output, the main memory control section 21 supplies, to the main memory (DRAM) 5, a row address (page address) including an address supplied from the bus master 6 through an I/O bus 8 and the I/O bus control section 9. The main memory control section 21 activates a page area, in the main memory, corresponding to the supplied address.

In this case, target data in the activated page of the main memory 5 can be immediately accessed by supplying only a column address in accordance with the address from the bus master 6.

Next, an operation performed in response to a main memory access request from a certain bus master 6 in the computer system having the bus bridge with the above arrangement will be described.

Figure 6:
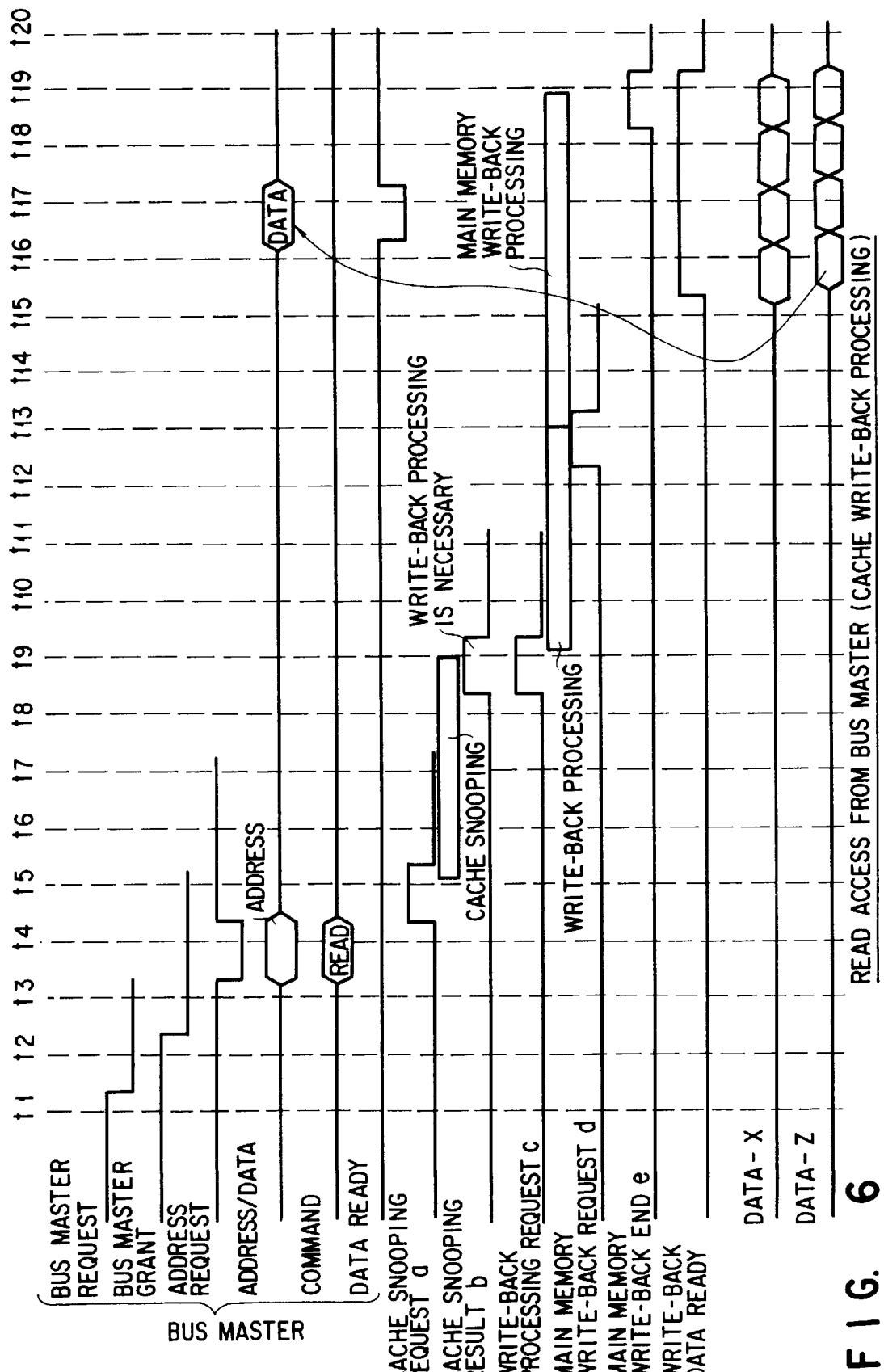
FIG. 6 is a timing chart showing an operation performed when a cache write-back operation is performed after a read request is output from the bus master in the computer system having the bus bridge shown in FIG. 5.

FIG. 6 is a timing chart showing an operation performed when a cache write-back operation is performed in response to a read request from a certain bus master 6 in the computer system having the bus bridge shown in FIG. 5.

More specifically, when the bus master 6 gains control of the I/O bus 8 by a grant signal from a bus arbiter in response to an access request from the bus master 6 to the I/O bus 8 (timings t1 to t3), the bus master 6 supplies an address and a read command to the I/O bus control section 9 of the bus bridge 4 through the I/O bus 8 (timing t4).

The I/O bus control section 9 then outputs a cache snooping request signal "a" to the cache snooping section 10 (timing at t5). The cache snooping section 10 snoops the hit/miss and the dirty/clean state in caches 2 and 3 through a CPU bus 7 (timings t6 to t9).

As in the computer system having the conventional bus bridge, the cache snooping results are classified into five states (1 to (5)), which respectively belong to either a case wherein a cache write-back operation is performed or a case where no cache write-back operation is performed.

Figure 3:
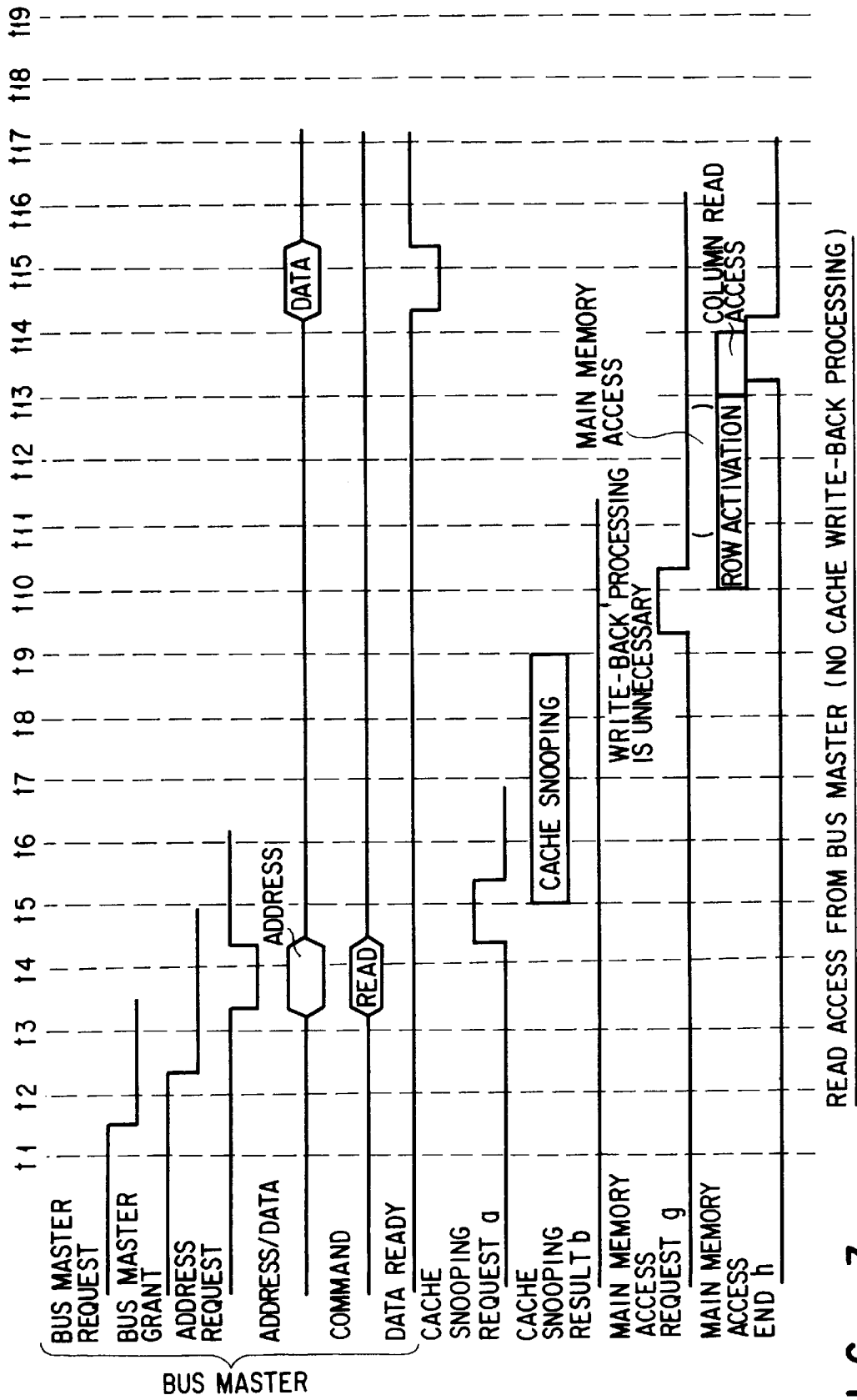
FIG. 3 is a timing chart showing an operation performed when no cache write-back operation is performed after a read request is output from a bus master in the computer system having the conventional bus bridge shown in FIG. 2.
Figure 4:
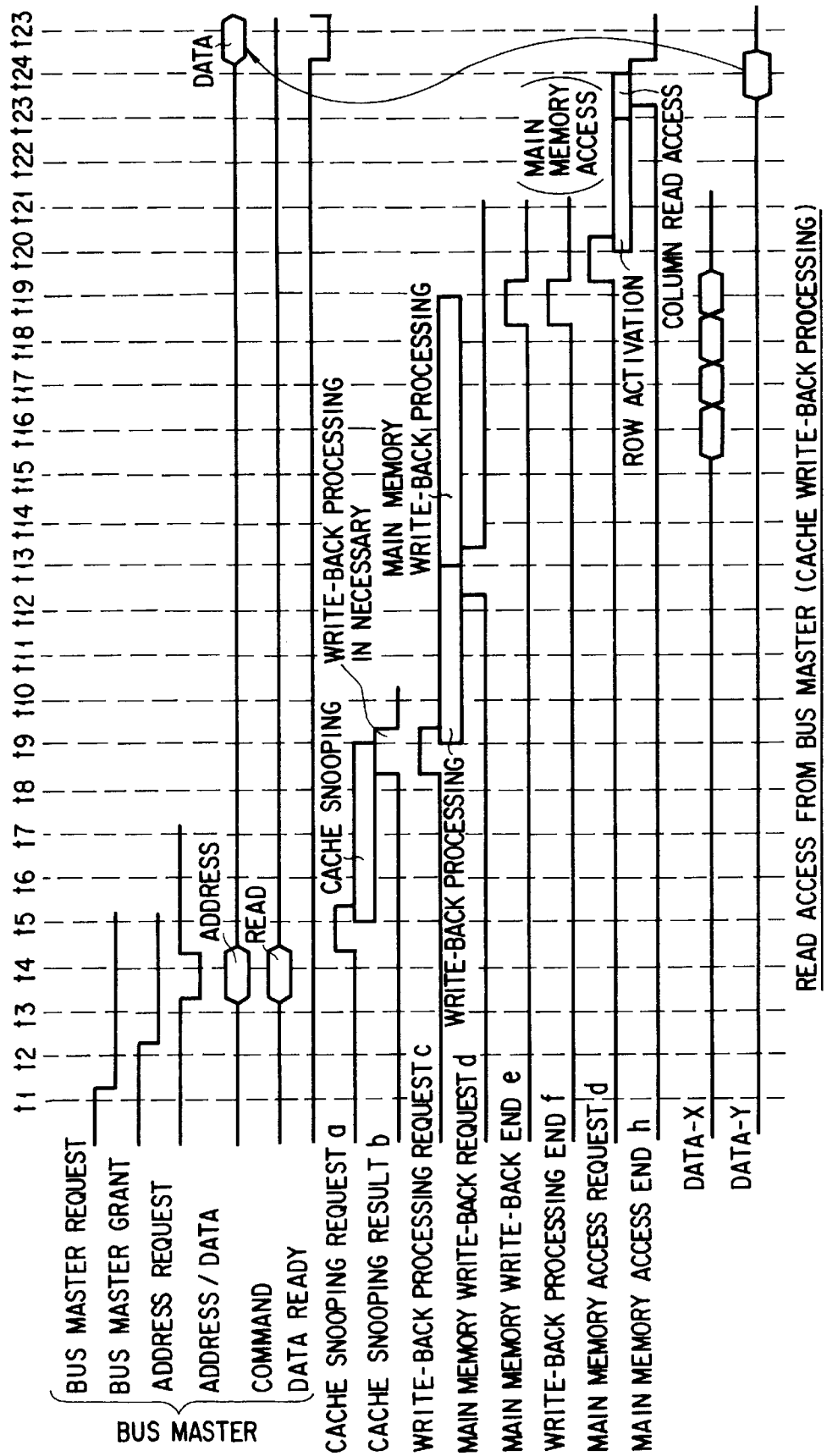
FIG. 4 is a timing chart showing an operation performed when a cache write-back operation is performed after a read request is output from the bus master in the computer system having the conventional bus bridge shown in FIG. 2.

An operation performed when no cache write-back operation is performed (states (1) and (2)) is the same as the operation (see FIG. 3) of the computer system having the conventional bus bridge.

An operation performed when a cache write-back operation is performed (states (3) to (5)) is as follows. First, the cache snooping section 10 informs the I/O bus control section 9 by a cache snooping result signal "b" of the necessity of a cache write-back operation. At the same time, the cache snooping section 10 outputs a write-back processing request signal "c" to the write-back control section 12 (timing t9).

Then, the write-back control section 12 performs write-back processing for data corresponding to one cache line (e.g., 32-byte data; 64-bit data×4 times) with respect to the CPU bus 7 (timings t9 to t13). Subsequently, the write-back control section 12 outputs a main memory write-back request signal "d" to the main memory control section 21 to start write-back processing for write-back data "DATA-X" with respect to the main memory 5 (timing t13 and thereafter).

At the same time, the write-back control section 12 outputs a write-back data ready signal "f" to the I/O bus control section 9 at the timing when write-back data "DATA-X" from the CPU bus 7 is simultaneously transferred to both the main memory control section 21 and the data bypass section 22. By this signal, the I/O bus control section 9 is informed that the write-back data including data required for the bus master 6 has been transferred to the data bypass section 22 (timings t13 to t16).

Upon reception of the write-back data ready signal "f" from the write-back control section 12, data received by the data bypass section 22 in accordance with an address from the bus master 6 is transferred by the I/O bus control section 9 to the bus master 6 through the I/O bus 8 (timings t16 and t17).

Upon completion of the write-back processing of the write-back data, the main memory control section 21 outputs a main memory write-back end signal "e" to the write-back control section 12 (timing t19).

With this processing, if a cache write-back operation is performed in response to a read request from the bus master 6 to the main memory 5, after the necessity of a write-back operation is ascertained by snooping the cache, the write-back data is written back in the main memory 5. At the same time, the I/O bus control section 9 can directly receive target data at the address from the bus master 6, through the data bypass section 22. The I/O bus control section 9 need not wait for completion of write-back processing for the main memory 5 or read out data from the main memory 5, and can transfer the target read data to the bus master 6 at a high speed.

Next, an operation performed when a cache write-back operation is performed in response to a write request from the bus master 6 in the computer system having the bus bridge will be described.

Figure 8:
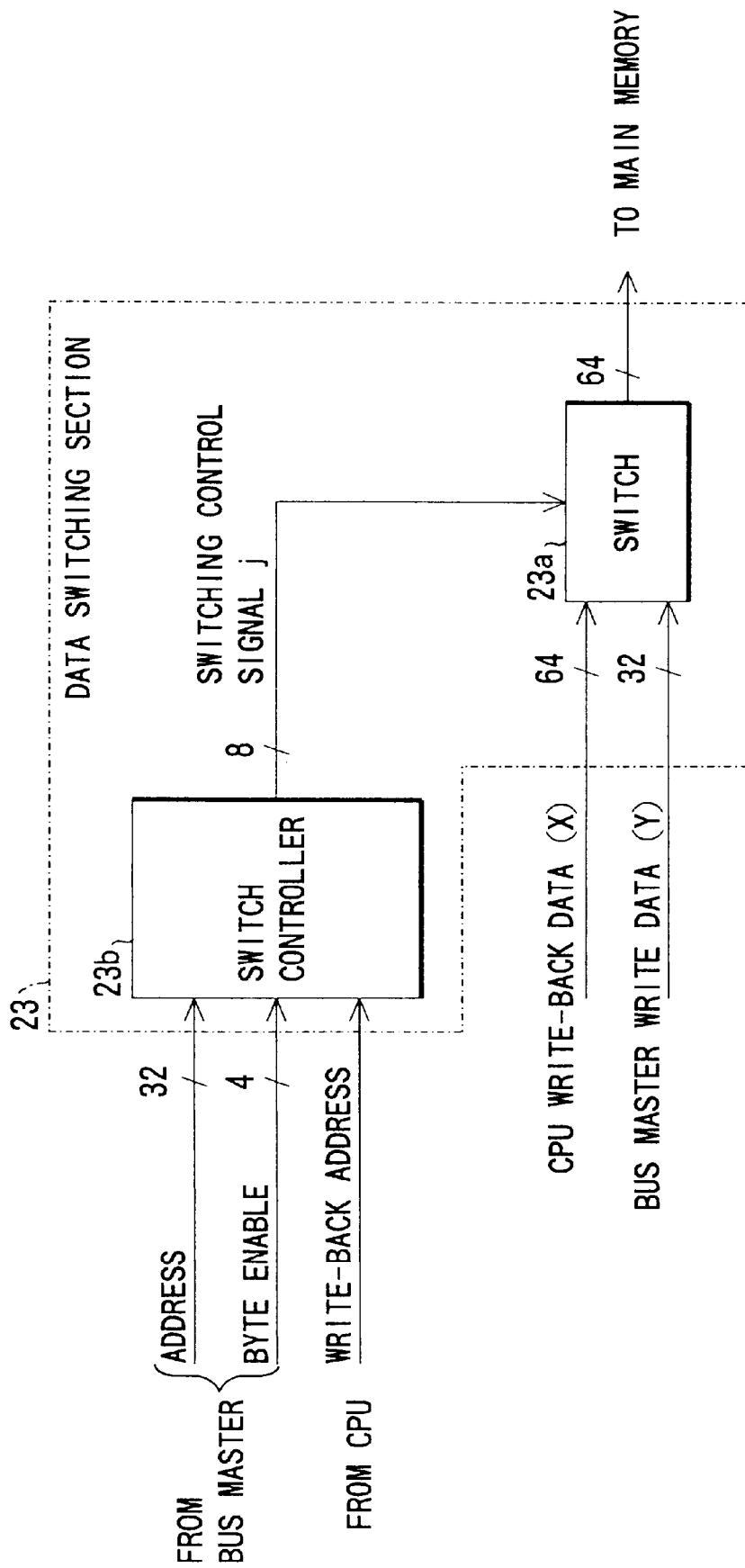
FIG. 8 is a block diagram showing the arrangement of a data switching section arranged in the main memory control section of the computer system having the bus bridge shown in FIG. 5.

FIG. 8 is a block diagram showing the arrangement of the data switching section 23 arranged in the main memory control section 21 of the computer system having the bus bridge shown in FIG. 5.

The data switching section 23 comprises a switch 23a and a switch controller 23b.

The switch 23a is constituted by a multiplexer for switching and selecting, in units of bytes, cache write-back data "DATA-X" supplied from the write-back control section 12 by a burst transfer scheme of, e.g., 64-bit data×4 times, and bus master write data "DATA-Y" supplied as, e.g., 32-bit data including 1-byte write data from the I/O bus control section 9. In the switch 23a, 64-bit data in which only 1-byte data corresponding to cache write-back data is selectively rewritten in accordance with a write address from the bus master 6 is transferred to the main memory 5 and written back therein.

A switching control signal "j" for switching cache write-back data and bus master write data in units of bytes in the switch 23a is generated by the switch controller 23b on the basis of a 32-bit write address supplied from the bus master 6, a byte enable signal representing the address of 1-byte data, to be written, of the data, and a cache write-back address supplied from the CPU 1.

FIG. 9 is a view for explaining an operation of switching and selecting write-back data (64-bit data×4) corresponding to one cache line, and bus master write data (32-bit data) including 1-byte write data in the data switching section 23 arranged in the main memory control section 21 inside the bus bridge shown in FIG. 5.

More specifically, when the bus master 6 gains control of the I/O bus 8, an address, write data, and a write command are output onto the I/O bus 8.

Subsequent processing up to reception of write-back data from the cache by the write-back control section 12 of a bus bridge 4 is the same as the above-described operation performed when a cache write-back operation is performed in response to a read request from the bus master 6 (see timings t1 to t13 in FIG. 6).

In writing back cache write-back data from the write-back control section 12 to the main memory 5, the write-back control section 12 and the I/O bus control section 9 cooperate to merge the write-back data and write data from the bus master 6 in the data switching section 23 of the main memory control section 21, and to write back the resultant data in the main memory 5.

To write back the write-back data received from the cache in the main memory 5, the write-back control section 12 outputs a main memory write-back request signal "d" to the main memory control section 21.

In this case, the write-back data is sent to the main memory 5 by a burst transfer scheme of 64-bit data×4 times.

Each time the data switching section 23 of the main memory control section 21 receives 64-bit write-back data, it monitors the write-back address and detects the timing when the 64-bit write-back data at the write-back address including a write address from the bus master 6 is transferred.

When 64-bit write-back data corresponding to another write-back address not including the write address from the bus master is transferred to the switch 23a of the data switching section 23 in the main memory control section 21, an 8-bit switching control signal "j" from the switch controller 23b is set to the side where all the lines of the switch controller 23b select the write-back data, and the write-back data is directly written back in the main memory 5.

On the other hand, when it is detected that 64-bit write-back data corresponding to a write-back address including the write address from the bus master 6 is transferred to the switch 23a of the data switching section 23 in the main memory control section 21, it is detected whether the write address corresponds to the 32 bits on the even address side of the write-back data or the 32 bits on the odd address side. At the same time, it is detected on basis of the bus master byte enable signal which 1-byte data of the 32-bit write-back data on the even or odd address side corresponding to the write address is data to be rewritten with 1-byte data to be written from the bus master 6.

In this case, the 8-bit switching control signal "j" from the switch controller 23b is set to the side where only a line corresponding to the 1-byte data of the write-back data detected on the basis of the bus master write address and the bus master write enable signal selects bus master write data. The cache write-back data is written back in the main memory 5 after only 1-byte data at the write address required by the bus master 6 is rewritten with the 1-byte data to be written from the bus master 6.

With this processing, if a cache write-back operation is performed in response to a write request from the bus master 6 to the main memory 5, after the necessity of a write-back operation is determined by snooping the caches, write-back data is written back in the main memory 5, and at the same time write data from the bus master 6 is also written in the main memory 5. For this reason, write processing for bus master write data need not wait for completion of write-back processing for cache write-back data with respect to the main memory 5, and the write data from the bus master 6 can be written in the main memory 5 at a high speed.

More specifically, write-back processing for write-back data from the cache and write processing for write data from the bus master 6 can be performed by one access operation with respect to the main memory 5.

Next, an embodiment which enables a higher-speed data access irrespective of whether a cache write-back operation is or not in response to an access request from the bus master 6 to the main memory 5 will be described.

A main memory 5 in the computer system having the above bus bridge is normally constituted by various dynamic RAMs (DRAMs). In each DRAM, data is read and written in units of several Kbits called a page corresponding to a row address. In accessing the DRAM, first, a page (row address) must be activated, and then an address (column address) in the page must be specified to read/write data.

That is, the time required to read/write data varies depending on whether the page (row address) is activated in advance. If a row address corresponding to a page including a read/write address is activated in advance, the read/write operation is performed at a higher speed.

Figure 7:
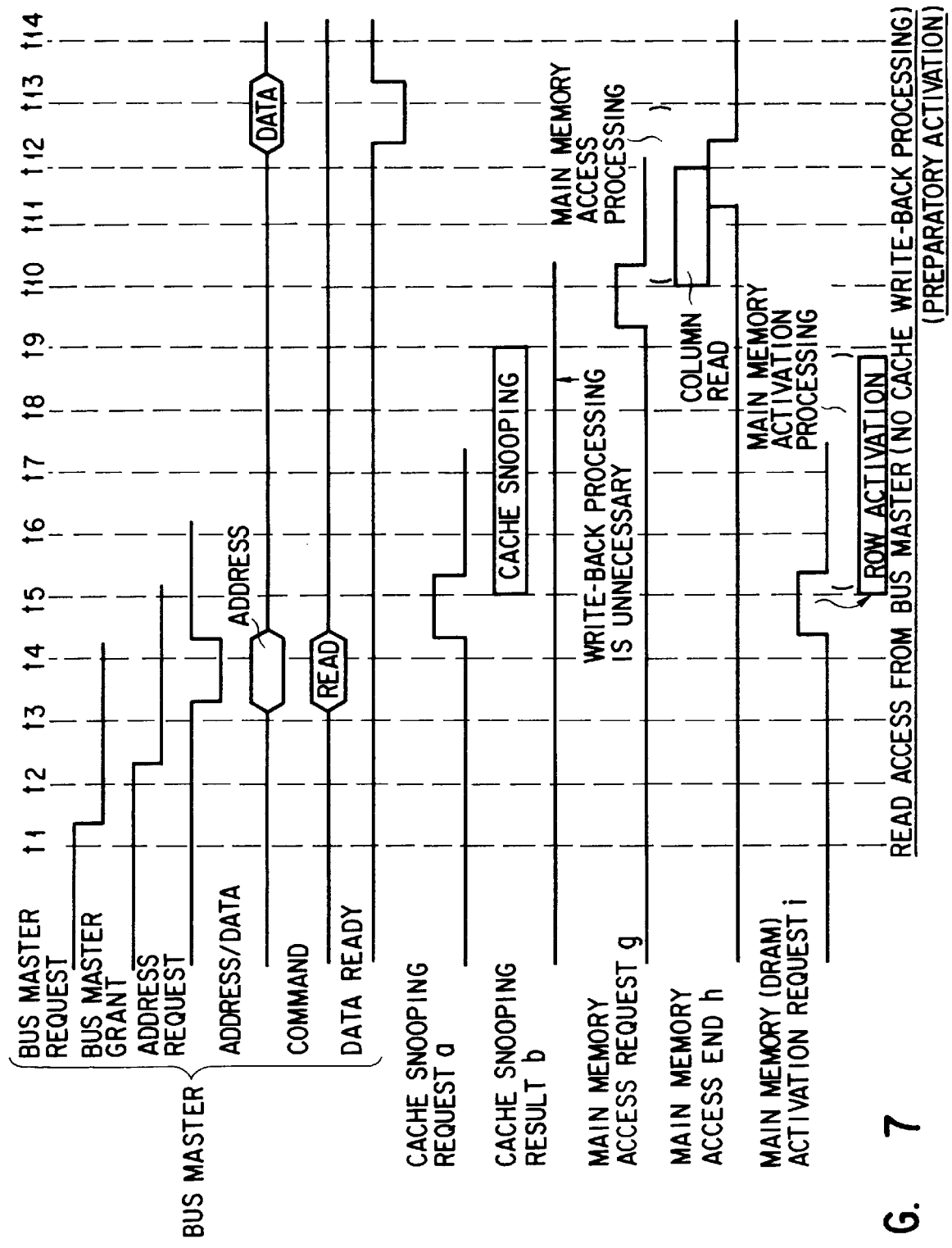
FIG. 7 is a timing chart showing an operation performed when DRAM preparatory activation processing is performed after a read request is output from the bus master in the computer system having the bus bridge shown in FIG. 5.

FIG. 7 is a timing chart showing an operation when DRAM preparatory activation processing is performed in response to a read request from a bus master 6 in the computer system having the bus bridge shown in FIG. 5.

The read operation in FIG. 7 is a read operation when no cache write-back operation is performed.

More specifically, if when the bus master 6 gains control of an I/O bus 8 by a grant signal from a bus arbiter in response to an access request from the bus master 6 to the I/O bus 8 (timings t1 to t3), the bus master 6 supplies an address and a read command to an I/O bus control section 9 of a bus bridge 4 through the I/O bus 8 (timing t4).

The I/O bus control section 9 then outputs a cache snooping request signal "a" to a cache snooping section 10. The cache snooping section 10 snoops the hit/miss and the dirty/clean state in caches 2 and 3 through a CPU bus 7. At the same time, the I/O bus control section 9 outputs a main memory (DRAM) activation request signal "i" to a main memory control section 21, which activates a row address corresponding to a page in the main memory 5 equivalent to a read address supplied from the bus master 6 (timings t5 to t9).

In this case, since no cache hit occurs, or data is clean even if a cache hit occurs, the cache snooping section 10 informs the I/O bus control section 9 by a cache snooping result signal "b" of the unnecessity of a cache write-back operation, i.e., permission to start a main memory read operation. The I/O bus control section 9 outputs a main memory read request signal "g" to a main memory control section 21 (timings t9 and t10).

In accordance with an address supplied from the bus master 6 to the main memory control section 21 through the I/O bus control section 9, target data is immediately read out from the main memory 5 only by designating a column address with respect to the main memory 5 (timings t10 to t12). The data read out by the main memory control section 21 is supplied to the I/O bus control section 9 together with a main memory read end signal "h", and transferred to the bus master 6 through the I/O bus 8 (timings t12 and t13).

When, therefore, a read request is output from the bus master 6 to the main memory 5, the read cycle of data from the bus master 6 which starts upon snooping the caches can be greatly shortened by performing an operation of activating in advance a page (row address) in the DRAM while snooping the caches.

Note that the data access cycle can be greatly shortened by activating in advance a page (row address), in the main memory (DRAM) 5, corresponding to an access-requested address while snooping a cache in response to a main memory access request from the bus master 6, when any of main memory access operations is performed in accordance with bus master requests, i.e., the above-described write-back operation (FIG. 6) with respect to the main memory 5 which is performed at the same time as bypass processing for read data when a cache write-back operation is performed in response to a read request from the bus master 6, the above-described write-back operation (FIGS. 8 and 9) with respect to the main memory 5 which is performed at the same time as write processing for write data when a cache write-back operation is performed in response to a write request from the bus master, and a direct write operation with respect to the main memory 5 when no cache write-back operation is performed in response to a write request from the bus master, in addition to the above-described direct read operation (FIG. 7) from the main memory 5 when no cache write-back operation is performed in response to a read request from the bus master 6.

According to the computer system having the bus bridge with the above arrangement, if the necessity of a cache write-back operation is informed by the cache snooping section 10 in response to a read request from the bus master 6 to the main memory 5, cache write-back data is written back in the main memory 5 from the write-back control section 12 through the main memory control section 21 and also transferred to the data bypass section 22. Target data at a read-requested address is directly sent to the I/O bus control section 9 through the data bypass section 22, and transferred to the bus master 6 through the I/O bus 8. For this reason, data read processing from the main memory 5 need not wait for completion of write-back processing with respect to the main memory 5, and target read data can be supplied to the bus master 6 at a high speed.

According to the computer system having the bus bridge with the above arrangement, if the necessity of a cache write-back operation is informed by the cache snooping section 10 in response to a write request from the bus master 6 to the main memory 5, cache write-back data transferred from the write-back control section 12 to the main memory control section 21 is written back in the main memory 5 after data, of the cache write-back data, at a write-requested address is replaced with write data from the bus master 6 in the data switching section 23. Therefore, the write data from the bus master 6 is also written in the main memory 5 at the same time as the write-back data is written back in the main memory 5. Write processing for bus master write data need not wait for completion of write-back processing for cache write-back data with respect to the main memory 5, and the write data from the bus master 6 can be written in the main memory 5 at a high speed.

Further, according to the computer system having the bus bridge with the above arrangement, when an access request is output from the bus master 6 to the main memory (DRAM) 5, a page, in the main memory (DRAM) 5, corresponding to an access-requested address is activated in advance while snooping the necessity/unnecessity of a cache write-back operation through the cache snooping section 10. Therefore, in a direct data access to the main memory 5 by the bus master 6 after snooping the caches, or in write-back processing for cache write-back data by the write-back control section 12 with respect to the main memory 5, data can be immediately accessed only by designating a column address with respect to the main memory 5. The access cycle of data from the bus master 6 can be greatly shortened.

As has been described in detail above, in the computer system having the bus bridge according to the first aspect of the present invention, when a cache hit occurs in response to a read request from the bus master to the main memory, read data corresponding to a read-requested address is directly received from write-back data for the main memory. For this reason, read processing from the main memory need not wait for completion of write-back processing with respect to the main memory, and target read data can be supplied to the bus master at a high speed.

In the computer system having the bus bridge according to the second aspect of the present invention, when a cache hit occurs in response to a write request from the bus master to the main memory, write-back processing for write-back data with respect to the main memory, and write processing for write data from the bus master are simultaneously performed. For this reason, write processing for write data need not wait for completion of write-back processing for write-back data with respect to the main memory, and the write data from the bus master can be written in the main memory at a high speed.

Further, in the computer system having the bus bridge according to the third aspect of the present invention, after an access request is output from the bus master to the main memory, a row address corresponding to an access-requested address in the main memory is activated in advance, while it is snooped to see whether data corresponding to the access-requested address is found in the cache and a hit/miss occurs. In accessing data in the main memory in accordance with the snooping result of the cache, the data is accessed by designating only a column address corresponding to the access-requested address of the main memory. For this reason, the data access cycle of the bus master with respect to the main memory after snooping the caches can be greatly shortened.

According to the present invention, therefore, even if a cache write-back operation is required in response to an access request from the bus master to the main memory, the main memory access operation can be performed at a high speed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A computer system comprising:
   a first bus;
   a processor coupled to said first bus;
   a cache memory having a write-back scheme, coupled to said first bus and accessed by said processor;
   a second bus;
   a bus master coupled to said second bus;
   a main memory which is commonly accessed through said first bus or second bus; and
   a bus bridge for connecting said first and second buses, said bus bridge comprising:
      cache snooping means, responsive to an access request from said bus master to said main memory, for snooping said cache memory to see whether an address in the access request satisfies a cache hit or miss, and data corresponding to the address is dirty or clear,
      data bypass means for receiving data which is the same data as to be written back from said cache memory to said main memory, and transferring the received data onto the second bus, and
      write-back means for simultaneously transferring the data from said cache memory to both of said main memory and said data bypass means in the case where a snooping result by said cache snooping means indicates that the cache hit has occurred and the data is dirty and the access request indicates a read request, and for transferring the data from said cache memory to said main memory without transferring to said data bypass means in the case where a snooping result by said cache snooping means indicates that the cache hit has occurred and the data is dirty and the access request does not indicate a read request.

2. A system according to claim 1, wherein said data bypass means comprises a FIFO (First-In First-Out) memory.

3. A system according to claim 1, wherein said bus bridge further comprises main memory access means, responsive to the snooping result by said cache snooping means indicating the cache miss, for directly accessing said main memory from the second bus in accordance with the address in the access request.

4. A system according to claim 1, wherein said bus bridge further comprises main memory write means for, in the case where the access request indicates a write request, reflecting the data from said cache memory on the data from said bus master and writing the resultant data in said main memory while said write-back means performs writing back.

5. A system according to claim 4, wherein said main memory write means comprises means for merging the data from said cache memory and the data from said bus master.

6. A system according to claim 1, wherein said main memory comprises a DRAM (Dynamic Random Access Memory).

7. A system according to claim 1, wherein said bus bridge further comprises preparatory row activation means for activating a row address of said main memory in accordance with the address in the access request, in advance while said cache snooping means performs snooping.

8. A system according to claim 7, wherein said bus bridge further comprises means for designating a column address of said main memory in accordance with the address in the access request, thereby accessing said main memory.

9. A bus bridge for mutually connecting a first bus to which a processor and a corresponding cache memory having a write-back scheme are coupled, a second bus to which a bus master is coupled, and a main memory which is commonly accessed through said first bus or second bus, comprising:
   cache snooping means, responsive to an access request from said bus master to said main memory, for snooping said cache memory to see whether an address in the access request satisfies a cache hit or miss, and data corresponding to the address is dirty or clear;
   data bypass means for receiving data which is the same data as to be written back from said cache memory to said main memory, and transferring the received data onto the second bus; and
   write-back means for simultaneously transferring the data from said cache memory to both of said main memory and said data bypass means in the case where a snooping result by said cache snooping means indicates that the cache hit has occurred and the data is dirty and the access request indicates a read request, and for transferring the data from said cache memory to said main memory without transferring to said data bypass means in the case where a snooping result by said cache snooping means indicates that the cache hit has occurred and the data is dirty and the access request does not indicate a read request.

10. A bus bridge according to claim 9, wherein said data bypass means comprises an FIFO (First-In First-Out) memory.

11. A bus bridge according to claim 9, wherein said bus bridge further comprises main memory access means, responsive to the snooping result by said cache snooping means indicating the cache miss, for directly accessing said main memory from the second bus in accordance with the address in the access request.

12. A bus bridge according to claim 9, wherein said bus bridge further comprises main memory write means for, in the case where the access request indicates a write request, reflecting the data from said cache memory on the data from said bus master and writing the resultant data in said main memory while said write-back means performs writing back.

13. A bus bridge according to claim 12, wherein said main memory write means comprises means for merging the data from said cache memory and the data from said bus master.

14. A bus bridge according to claim 9, wherein said main memory comprises a DRAM (Dynamic Random Access Memory).

15. A bus bridge according to claim 9, wherein said bus bridge further comprises preparatory row activation means for activating a row address of said main memory in accordance with the address in the access request, in advance while said cache snooping means performs snooping.

16. A bus bridge according to claim 15, wherein said bus bridge further comprises means for designating a column address of said main memory in accordance with the address in the access request, thereby accessing said main memory.

* * * * *